United States Patent [19]
Gaus et al.

[11] Patent Number: 5,572,484
[45] Date of Patent: Nov. 5, 1996

[54] SHORT RANGE ULTRASONIC DISTANCE WARNING SYSTEM FOR MOTOR VEHICLE

[75] Inventors: Hermann Gaus, Sillenbuch; Gerhard Franke, Weissach im Tal; Wolfgang Stahl, Oberboihingen, all of Germany

[73] Assignee: Mercedes-Benz AG, Germany

[21] Appl. No.: 504,109

[22] Filed: Jul. 19, 1995

[30] Foreign Application Priority Data

Jul. 19, 1994 [DE] Germany .......................... 44 25 419.9

[51] Int. Cl.⁶ ..................................................... G01S 15/00
[52] U.S. Cl. .............................. 367/99; 367/909; 340/435; 180/167
[58] Field of Search .................. 367/99, 909; 340/425.5, 340/435, 436; 180/167; 364/424.01

[56] References Cited

U.S. PATENT DOCUMENTS

| 4,015,232 | 3/1977 | Sindle | 367/909 |
| 4,803,670 | 2/1989 | Chen | 367/99 |
| 4,931,930 | 6/1990 | Shyu et al. | 340/425.5 |
| 5,173,881 | 12/1992 | Sindle | 367/101 |

FOREIGN PATENT DOCUMENTS

| 3244358C2 | 10/1984 | Germany . |
| 4208065A1 | 11/1992 | Germany . |
| 60-152968A | 8/1985 | Japan . |
| 60-152968 | 9/1985 | Japan . |

OTHER PUBLICATIONS

Ultraschallechos als Parkpilot, Radio Fernsehen Elekt, 1991, p. 594.

Primary Examiner—Ian J. Lobo
Attorney, Agent, or Firm—Evenson, McKeown, Edwards & Lenahan, P.L.L.C.

[57] ABSTRACT

A short range ultrasonic distance warning system is used as a parking aid in a motor vehicle. The entire system is active in the case of reverse gear being selected and low speed, and is deactivated automatically at higher speed. If reverse gear is not being selected, only the system part for front space monitoring is active at low speed of travel, while the system is once again automatically kept inactivated at higher speed. This implements a parking aid which is convenient and avoids unnecessary system activations.

12 Claims, 1 Drawing Sheet

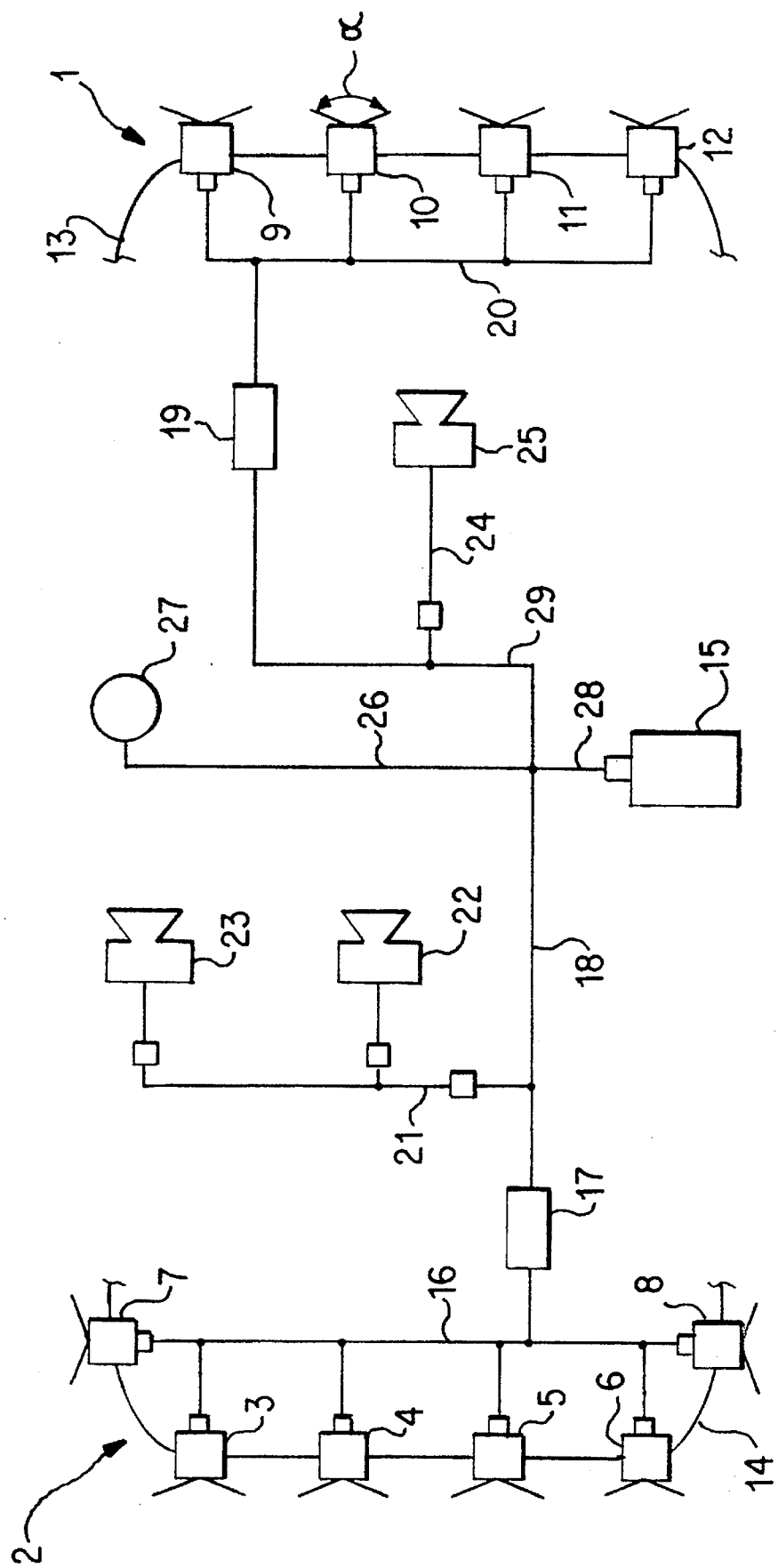

SHORT RANGE ULTRASONIC DISTANCE WARNING SYSTEM FOR MOTOR VEHICLE

BACKGROUND AND SUMMARY OF THE INVENTION

The present invention relates to a short range ultrasonic distance warning system in a motor vehicle having a rear-end transmitter and receiver arrangement, a front-end transmitter and receiver arrangement having at least one transmitter and receiver unit for a central front area of the vehicle and one transmitter and receiver unit for front corner areas of the vehicle, a controller for activating and deactivating the transmitter and receiver arrangements and at least one of acoustic and optical warning elements which, when the transmitter and receiver arrangements are activated, are operatively associated therewith to generate warning signals as a function of the output signals thereof. In such a warning system a transmitter and receiver arrangement are at the rear end and at the front end, and operate with ultrasound for the detection of nearby objects at a distance of typically up to one or a few meters. Differing from longer range distance warning systems, such as are used for controlling the safety spacing during the journey, a short range warning system of this type is predominantly used as a parking aid which is intended to support the driver in the estimation of distances from objects in invisible vehicle areas.

U.S. Pat. No. 5,173,881 discloses a known ultrasonic distance warning system where, apart from in each case a longer range transmitter and receiver unit at the front and at the rear, short range transmitter and receiver arrangements are positioned in the four vehicle corner areas and in each case therebetween at the front, at the rear and on the sides. Each arrangement consists of a pair of transmitter and receiver units with a lateral emission angle of about 120°. As a warning indicator, a warning element is provided which, as a function of the position and distance of a detected object relative to the vehicle, provides optical indications in graduated colors and, in the case of a very short distance, an acoustic indication as well. The activation and deactivation of the distance warning system is carried out as a whole at the driver's request, for example by a dedicated remote control, together with the actuation of the ignition or a door locking system or by actuating the gears.

In an article entitled "Ultraschallechos als Parkpilot" [translation, Ultrasonic Echoes As Parking Guide] in the "Radio Fernsehen Elektronik" [translation, Radio, TV, Electronics], Vol. 10, p. 594, an ultrasonic distance warning system is described for monitoring the rear vehicle area as a parking aid. This system includes positioning up to eight sensors and being automatically activated by selecting reverse gear. The warning indication is carried out optically in different colors, graduated according to distance, and in the case of a very short distance by an acoustic signal as well.

In Laid-Open Application JP 60/152968, an ultrasonic distance warning system is described in which, inter alia, two short range and a long range transmitter and receiver unit are arranged in each case at the front and at the rear. The activation of the various units is carried out such that in the case of a low speed in the forward direction, the front-end, short range units are activated, whereas in the case of a low speed in the reverse direction the rear-end, short range units are activated and at high speed the two long range units are activated.

Laid-Open Application DE 38 13 083 A1 discloses an automatic parking device for motor vehicles which, to measure distance, uses ultrasonic distance measuring units of which one in each case is arranged emitting laterally and one to the front or to the rear at each vehicle corner area. The ultrasonic distance measuring units are controlled by a microcomputer so that only the measuring units emitting to the left or to the right laterally are actuated when the vehicle is travelling forwards, in order to look for a parking position on the left-hand or right-hand side. The measuring units arranged on the right-hand vehicle side are actuated when the vehicle is travelling backwards in order to park on the right-hand side parallel to the roadway, and only the two measuring units emitting to the rear are actuated when the vehicle is travelling backwards in order to park on the right-hand side at right angles to the roadway.

Laid-Open Application DE 42 08 065 A1 describes a distance warning device which has light-optical transmitter/receiver units which are arranged in the vehicle corner areas and are switched on with the selection of reverse gear and/or a low forward gear.

German Patent Specification 32 44 358 C2 describes a device for the detection of obstacles as a maneuvering aid during parking or turning a motor vehicle. Optical indicator elements and/or an acoustic indicator device can be provided to generate sound pulses which vary with respect to pitch and/or repetition frequency with the distance of an obstacle from the vehicle. Provision can also be made for the maneuvering aid device to be switched on automatically as a result of the selection of reverse gear, if appropriate in combination with releasing the handbrake and/or releasing the clutch pedal or beginning a backwards movement of the vehicle.

It is an object of the present invention to provide a short range ultrasonic distance warning system, suitable as a parking aid which makes possible the optimum detection of, for example, objects occurring in the vicinity of the vehicle during a parking process, and operates without unnecessary system activation.

This object has been achieved in accordance with the present invention by a short range ultrasonic distance warning system in which both the front-end and the rear-end transmitter and receiver arrangements are operatively configured to be activated when a reverse gear is active and speed of travel of the vehicle has not exceeded a prescribed first deactivation limiting value, only the front-end transmitter and receiver arrangement is activated when reverse gear is not active and the speed of travel has not exceeded a prescribed second deactivation limiting value, and both transmitter and receiver arrangements are deactivated during all other driving conditions.

In this arrangement, in a manner which saves power and avoids unnecessary ultrasonic emissions, the system parts in each case are kept activated, that is to say operationally ready, only when this can also lead to practical detection results. Thus, the entire system is kept inactive if the vehicle speed exceeds prescribed threshold values, since there is no parking process at speeds of this type and, above all, an object detection within the prescribed short range of at most one to a few meters could no longer be put to profitable use.

Also, when reverse gear is not being selected, the rear-end system part is kept inactive, because it is not needed during periods of forward travel. In contrast, in the case of periods of reverse travel, both the front-end and the rear-end system part are kept active to enable objects in the rear space and also such in the lateral front space to be detected, for optimum object registration. The latter is in particular effected by the front laterally arranged transmitter and receiver units. This is advantageous because just in the front corner regions during backward parking, as a result of applying severe lock to the steering, a collision-threatening approach to an already parked vehicle can be produced, which is often not detected until it is too late by the driver who, in this situation, is predominantly directing his attention to the rear space.

A further feature of the present invention results in a response hysteresis with respect to the activation and deactivation of the system, thereby preventing undesirably frequent switch-overs between the system states in the case of travel speeds in the vicinity of the switch-over threshold range.

An advantageous embodiment of the present invention provides warning elements having integrated optical and acoustic warning functions. One such element is assigned to the backward and two other elements are assigned to the front-end monitoring area. In a further contemplated embodiment, each warning element has an optical bar graph indicator with yellow and red fields which light up increasingly in a graduated manner as the distance from a detected object decreases, as well as an acoustic indicator which, in an advantageous manner, is driven such that the relationships during a parking process are particularly taken into account. For this purpose, in particular, loudspeaker activation is used in the case of forward travel only at a very small distance from an obstacle in the front corner areas, in order, for example, not to disturb unparking. Loudspeaker activation is used in the case of backward travel already at comparatively large distances from obstacles in the front-end monitoring area, in order that the driver who is looking to the rear can perceive a front-end approach to an obstacle in good time.

BRIEF DESCRIPTION OF THE SOLE FIGURE

These and other objects, features and advantages of the present invention will become readily apparent from the following detailed description when taken in conjunction with the accompanying sole FIGURE which is a schematic block diagram of a short range ultrasonic distance warning system according to the present invention and used as a parking aid in a motor vehicle.

DETAILED DESCRIPTION OF THE SOLE FIGURE

The illustrated ultrasonic warning system contains a rear-end transmitter and receiver arrangement designated generally by numeral 1, consisting of four transmitter and receiver units 9, 10, 11, 12 integrated in a rear-end bumper 13 of the vehicle, as well as a front-end transmitter and receiver arrangement designated generally by numeral 2, consisting of a further six transmitter and receiver units 3, 4, 5, 6, 7, 8 integrated in a front-end bumper 14, of which four units 3 to 6 are arranged frontally at the front and the two remaining units 7, 8 are arranged so as to monitor the front right and the front left corner area, respectively. All the transmitter and receiver units 3 to 12 have a lateral monitoring angle (alpha) of 120°.

In order to form an optimum registering area, the ranges of the two central front-end units 4, 5 are 80 cm, those of the remaining front-end units 3, 6, 7, 8 are 60 cm, those of the two central rear-end units 10, 11 are 120 cm and those of the two remaining rear-end units 9, 12 are 80 cm. The spacing and the positioning of the units 3 to 12 is such that the result is sections which are not detected at the front end and rear end with a maximum of 20 cm spacing from the respective bumper, the spacing in the front corner areas being only 15 cm.

To drive the transmitter and receiver units 3 to 12, a controller 15 is placed in the vehicle internal space, for example under the rear bench seat, and is connected via a plug and socket connection to a control line 28 which branches into a front-end control line 18, a rear-end control line 29 and a diagnostic line 26. The diagnostic line 26 ends in a diagnostic connection 27, via which the warning system can, if required, be subjected to a diagnosis of the system units. A harness 16 is connected to the front-end control line 18 via a plug and socket connection 17 and has lines which are led to the front-end transmitter and receiver units 3 to 8 via plug and socket connections.

In an analogous manner, a rear-end harness 20 is connected to the rear-end control line 29 via a plug and socket connection 19. The lines of the harness 20 are led via plug and socket connections to the rear-end transmitter and receiver units 9 to 12. In addition, a signal line 21 is connected to the front-end control line 18 via a further plug and socket connection and splits into two line branches to which in each case a combined optical and acoustic warning element 22, 23 is connected via associated plug and socket connections. Similarly, a signal line 24, to which a further combined optical and acoustic warning element 25 is connected, is connected to the rear-end control line 29 via a plug and socket connection.

The warning element 25 which is assigned to the rear-end monitoring is integrated into a rear courtesy lamp of the vehicle, while both of the warning elements 22, 23 assigned to the front-end monitoring are located in the left-hand or in the central air vent, alternatively above the instrument panel in the primary field of vision of the driver. The various plug and socket connections support a modular system construction, which also permits any desired partial combinations of the entire system, for example monitoring only of the rear space or only of the front space or the operation of only some of the front-end and of the rear-end units 3 to 12. The plug and socket connections are constructed in a watertight manner, particularly those to the transmitter and receiver units 3 to 12 placed in the bumpers.

Each warning element 22, 23, 25 contains, in a generally known manner which need not be shown, a wedge-shaped bar graph indicator which is subdivided into eight fields and can be driven in a graduated manner. The first six, narrower fields of the bar graph indicator consist of a material which is transparent to light and is colored yellow, while the two last, broader fields consist of a material which is transparent to light and is colored red. In addition, each warning element has a loudspeaker which can be controlled intermittently in a graduated fashion or to emit a continuous tone. The loudspeaker of the warning element 25 for the rear space monitoring emits a tone with a pitch which differs from that of the loudspeaker of the warning elements 22, 23 for the front space monitoring, so that the driver is in a position to locate the threatened area acoustically.

The characteristic control, which is executed by the controller 15, of the various system parts of the ultrasonic parking aid is as follows. Upon switching on the ignition, the warning elements 22, 23, 25 are initially driven in each case for a period lasting about two seconds for the purpose of automatic functional checking of the system. In the subsequent, continuous vehicle operation, the controller 15 has communicated thereto, in a generally known manner which need not be shown, by the remaining vehicle electrical units, data about the instantaneous vehicle speed, which is obtained, for example, from wheel speed measurements. In addition, the controller 15 is fed with information as to whether the reverse gear of the vehicle is activated or not. As a function of this data and of the instantaneous vehicle speed, the system is then kept active or inactive, as follows, by the controller 15.

For as long as the vehicle is not travelling in reverse gear and the velocity lies below a first deactivation limiting value which is, by way of example, 12 km/h, only the front-end system part 2, 22, 23 is activated, which means that the front-end transmitter and receiver units 3 to 8 are active and a frame which can be illuminated around the bar graph indicator in the two warning elements 22, 23 for the front space monitoring is illuminated in order to show operational readiness. The rear-end system part 1, 25 is kept inactive.

Now, in the case of reverse gear being further not activated, if the speed of travel in the case of forward travel exceeds the limiting value of 12 km/h, the controller 15 also deactivates the front-end system part 2, 22, 23, the illumination of the frames of the two warning elements 22, 23 for the front space monitoring being switched off and the front-end transmitter and receiver units 3 to 8 being placed in the current-free state. This avoids the unnecessary activation of the system, since in this speed range the information about an obstacle occurring within the short detection range of the system could no longer be made use of in any case. As soon as the speed of travel then falls once more below a prescribed first activation limiting value, which for the purpose of forming a hysteresis is less than the deactivation limiting value and is, by way of example, 10 km/h, the front-end system part 2, 22, 23 is once more activated.

If, however, a selected reverse gear is detected, the entire system for front and rear space monitoring is kept active by the controller 15, as long as the speed of travel remains below a second deactivation limiting value of, by way of example, once more 12 km/h. In this case all the transmitter and receiver units 3 to 12 have current applied to them and all the warning elements 22, 23, 25 are operationally ready, which is signalled by the respectively illuminated frame around the bar graph indicator. In this way, obstacles both in the rear space and predominantly in the front corner areas can be detected in good time by means of the warning system during backward travel at low speed, in particular during a parking process.

When reverse gear is selected, as soon as the speed of travel exceeds the limiting value of 12 km/h, the controller 15 deactivates the previously active total system as a whole, since once again here a detection of an object within the short system range at this speed would no longer be of use. If subsequently the backward speed of travel once more falls below a prescribed second activation limiting value of, by way of example, once more 10 km/h, analogous to the case of forward travel, the entire system is reactivated for front and rear space monitoring. The hysteresis which is formed in each case by the selection of a smaller speed limiting value for system activation by comparison with the limiting value for system deactivation prevents an undesirable continuous switch-over between activation and deactivation of warning system parts, if the speed of travel lies in the region of the limiting values.

If the rear-end warning system part 1, 25 is activated or if the entire system 1, 2, 22, 23, 25 is activated, the controller 15 controls the respectively active transmitter and receiver units to emit a distance-measuring ultrasonic wave cone. These units then detect, via an integrated receiver part, reflections from objects lying in the detection range, and send back corresponding distance information to the controller 15. The controller 15 controls the warning elements 22, 23, 25 as a function of the respectively incoming distance information as follows.

On detecting an object in the rear space, the rear-end warning element 25 is activated for a corresponding indication; on detecting an object in the right front area, that is to say in the area of the front right transmitter and receiver units 3, 4, 7, one front-end warning element 23 is activated for a corresponding indication; and, on detecting an object in the left front area, that is to say in the area of the front left transmitter and receiver units 5, 6, 8, the other front-end warning element 22 is activated for a corresponding indication.

The indication is carried out as a function of the distance of the object detected in the respective area in the case of approaching a detected obstacle initially by increasing illumination of the yellow or red fields on the bar graph of that warning element which belongs to the area in which the obstacle is located. In the case of further approach, an additional acoustic warning follows via the associated loudspeaker, specifically in a different manner depending on whether travel is forwards or backwards. During forward travel, the acoustic warning is activated when the distance from the obstacle in the frontal front area falls below 30 cm or, in the front corner areas, below 15 cm. During backward travel, in which the entire system is activated, the acoustic warning comes on in the rear-end warning element 25 when the rear-end distance from an obstacle falls below 30 cm, and the acoustic warning in one of the two front-end warning elements 22, 23 is activated if the distance from the obstacle in the front area becomes less than 60 cm. The latter serves for the purpose of warning the driver, who is looking to the rear during backward travel, in good time of an approach to an obstacle in the front area.

The acoustic warning comes on with a bleeping sound as soon as the respective critical distance is reached, at which at the same time the red fields of the corresponding bar graph illuminate. If the distance from the obstacle decreases still further until below a prescribed distance value of, for example, about 20 cm, the acoustic warning changes into a continuous tone. By way of the different pitch of the front-end and rear-end loudspeakers, the driver can recognize without difficulty whether the obstacle is located in the rear space or in the front space of the vehicle.

It is now apparent that the above-described short range ultrasonic warning system makes available a convenient parking aid which supports the driver in the optimum utilization of parking space and the detection even of moving obstacles. In particular for smaller persons or for only occasional users who are not so familiar with the vehicle dimensions, maneuvering processes are facilitated with this system. This is particularly so if, as is often common in the case of aerodynamically configured vehicles, the vehicle end areas cannot be observed. As a result of the special manner of keeping the entire system or parts of the system active or inactive according to the driving situation, the active system condition is limited to just those driving conditions in which in each case detection of an obstacle in the relevant area is still of practical use.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A short range ultrasonic distance warning system for use in a vehicle as a parking aid, comprising a rear-end transmitter and receiver arrangement, a front-end transmitter and receiver arrangement having at least one transmitter and receiver unit for a central front area of the vehicle and one transmitter and receiver unit for front corner areas of the vehicle, a controller for activating and deactivating the transmitter and receiver arrangements and at least one of acoustic and optical warning elements which, when the transmitter and receiver arrangements are activated, are operatively associated therewith to generate warning signals as a function of the output signals thereof, wherein the front-end and the rear-end transmitter and receiver arrangements are operatively configured to be activated when a reverse gear is active and speed of travel of the vehicle has not exceeded a prescribed first deactivation limiting value, only the front-end transmitter and receiver arrangement is activated when reverse gear is not active and the speed of travel has not exceeded a prescribed second deactivation limiting value, and transmitter and receiver arrangements are deactivated during all other driving conditions.

2. The ultrasonic distance warning system according to claim 1, wherein a transmitter and receiver arrangement which had previously been deactivated as a result of exceeding one of the deactivation limiting value, is configured to be reactivated when the speed of travel falls below an associated, prescribed activation limiting value which is less than the corresponding associated deactivation limiting value.

3. The ultrasonic distance warning system according to claim 1, wherein a combined optical and acoustic warning element is provided for a left front area, a right front area and a rear area of the vehicle.

4. The ultrasonic distance warning system according to claim 3, wherein a transmitter and receiver arrangement which had previously been deactivated as a result of exceeding one of the deactivation limiting value, is configured to be reactivated when the speed of travel falls below an associated, prescribed activation limiting value which is less than the corresponding associated deactivation limiting value.

5. The ultrasonic distance warning system according to claim 1, wherein the acoustic warning in a warning element belonging to an activated transmitter and receiver arrangement is arranged to be activated when during forward travel the distance from a detected obstruction is less than 30 cm in a frontal area and less than 15 cm in front corner areas, and during backward travel is less than 30 cm in the rear area and less than 60 cm in the front area, and the acoustic warning coming on intermittently and changing to a continuous tone if a prescribed low distance limiting value is reached and the pitch of the acoustic warning from the rear space monitoring differing from that from the front space monitoring.

6. The ultrasonic distance warning system according to claim 5, wherein a transmitter and receiver arrangement which had previously been deactivated as a result of exceeding one of the deactivation limiting value, is configured to be reactivated when the speed of travel falls below an associated, prescribed activation limiting value which is less than the corresponding associated deactivation limiting value.

7. The ultrasonic distance warning system according to claim 5, wherein a combined optical and acoustic warning element is provided for a left front area, a right front area and a rear area of the vehicle.

8. The ultrasonic distance warning system according to claim 7, wherein a transmitter and receiver arrangement which had previously been deactivated as a result of exceeding one of the deactivation limiting value, is configured to be reactivated when the speed of travel falls below an associated, prescribed activation limiting value which is less than the corresponding associated deactivation limiting value.

9. An ultrasonic distance warning method for use as a parking aid in a vehicle, comprising the steps of (a) activating front-end and rear-end transmitter arrangements when a reverse gear is active and a speed of travel of the vehicle has not exceeded a prescribed first deactivating limiting value, (b) activating only the front-end transmitter and receiver arrangement when reverse gear is not active and the speed of travel has not exceeded a prescribed second deactivation limiting value, and (c) deactivating both the front-end and rear-end transmitter and receiver arrangements during driving conditions other than those specified in steps (a) and (b) above.

10. The method according to claim 9, wherein a previously deactivated transmitter and receiver arrangement which exceeded one of the deactivation limiting values, this is reactivated as soon as the speed of travel falls below an associated, prescribed activation limiting value, which is less than the corresponding associated deactivation limiting value.

11. The method according to claim 9, wherein an acoustic warning in a warning element belonging to an activated transmitter and receiver arrangement comes on if the distance from a detected obstruction in the case of forward travel is less than 30 cm in the frontal front area and less than 15 cm in the front corner areas, and in the case of backward travel is less than 30 cm in the rear area and less than 60 cm in the front area, the acoustic warning coming on intermittently and changing to a continuous tone if a prescribed low distance limiting value is reached and the pitch of the acoustic warning from the rear space monitoring differing from that from the front space monitoring.

12. The method according to claim 11, wherein a previously deactivated transmitter and receiver arrangement which exceeded one of the deactivation limiting values is reactivated as soon as the speed of travel falls below an associated, prescribed activation limiting value, which is less than the corresponding associated deactivation limiting value.

\* \* \* \* \*